(12) United States Patent
Lee et al.

(10) Patent No.: US 8,597,826 B2
(45) Date of Patent: Dec. 3, 2013

(54) NONAQUEOUS ELECTROLYTE COMPRISING OXYANION AND LITHIUM SECONDARY BATTERY USING THE SAME

(75) Inventors: Ho Chun Lee, Daejeon (KR); Hyeong Jin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/576,084

(22) PCT Filed: Dec. 7, 2005

(86) PCT No.: PCT/KR2005/004169
§ 371 (c)(1),
(2), (4) Date: Mar. 27, 2007

(87) PCT Pub. No.: WO2006/062346
PCT Pub. Date: Jun. 15, 2006

(65) Prior Publication Data
US 2008/0254370 A1    Oct. 16, 2008

(30) Foreign Application Priority Data
Dec. 7, 2004   (KR) .................. 10-2004-0102532

(51) Int. Cl.
*H01M 6/04*      (2006.01)
*H01M 6/16*      (2006.01)

(52) U.S. Cl.
USPC ..................... 429/188; 429/324; 429/325

(58) Field of Classification Search
None
See application file for complete search history.

(56) References Cited

U.S. PATENT DOCUMENTS

| | | | | |
|---|---|---|---|---|
| 3,928,076 A | * | 12/1975 | Moser et al. | 429/199 |
| 4,440,836 A | * | 4/1984 | Bailey | 429/48 |
| 5,168,019 A | | 12/1992 | Sugeno | |
| 5,677,083 A | * | 10/1997 | Tomiyama | 429/231.3 |
| 5,707,756 A | * | 1/1998 | Inoue et al. | 429/57 |
| 6,162,563 A | * | 12/2000 | Miura et al. | 429/309 |
| 6,210,513 B1 | * | 4/2001 | Hirata et al. | 156/230 |
| 6,258,480 B1 | * | 7/2001 | Moriwaki et al. | 429/176 |
| 6,656,638 B1 | | 12/2003 | Yamura | |
| 6,833,220 B1 | | 12/2004 | Yokoyama et al. | |

(Continued)

FOREIGN PATENT DOCUMENTS

| EP | 0872450 A1 | 10/1998 |
|---|---|---|
| EP | 1258938 A1 | 11/2002 |

(Continued)

OTHER PUBLICATIONS

JPO IPDL machine translation, JP11250933, published Sep. 17, 1999, retrieved Jun. 11, 2009.*

(Continued)

*Primary Examiner* — Kwang Han
(74) *Attorney, Agent, or Firm* — Birch, Stewart, Kolasch & Birch, LLP

(57) ABSTRACT

Disclosed is an electrolyte comprising: (a) an electrolyte salt; (b) a non-aqueous electrolyte solvent; and (c) a binary or multinary metal oxide salt. An electrochemical device comprising the same electrolyte is also disclosed. The metal oxide salt used in the electrolyte is dissolved in a non-aqueous solvent and generates oxyanions capable of improving corrosion resistance of metals. Therefore, the electrolyte prevents corrosion of metallic materials present in an electrochemical device, caused by extreme conditions, such as overcharge, overdischarge and high-temperature storage conditions, to which the device is exposed. Further, the electrolyte prevents degradation in the quality of an electrochemical device, caused by corrosion of metallic materials.

9 Claims, 1 Drawing Sheet

(56) References Cited

U.S. PATENT DOCUMENTS

| | | | |
|---|---|---|---|
| 6,986,970 B1 * | 1/2006 | Kumar et al. ............ | 429/324 |
| 2004/0072079 A1 | 4/2004 | Hashimoto et al. | |
| 2004/0151837 A1 | 8/2004 | Morita et al. | |
| 2005/0153209 A1 * | 7/2005 | Vallee et al. ............ | 429/314 |
| 2007/0026309 A1 * | 2/2007 | Notten et al. ............ | 429/209 |

FOREIGN PATENT DOCUMENTS

| | | | |
|---|---|---|---|
| EP | 1369951 A1 | | 12/2003 |
| EP | 1465267 A2 | | 10/2004 |
| JP | 59-060865 A | | 4/1984 |
| JP | 59060865 A | | 4/1984 |
| JP | 59-171469 A | | 9/1984 |
| JP | 60160570 A | | 8/1985 |
| JP | 01-200572 A | | 8/1989 |
| JP | 2294383 A | | 12/1990 |
| JP | 08007886 A | | 1/1996 |
| JP | 09115515 A | | 5/1997 |
| JP | 11-250933 A | | 9/1999 |
| JP | 11250933 | * | 9/1999 |
| JP | 2000011996 A | | 1/2000 |
| JP | 2000048828 A | | 2/2000 |
| JP | 2002075367 A | | 3/2002 |
| JP | 2002237333 A | | 8/2002 |
| JP | 2004-152619 A | | 5/2004 |
| JP | 2005025992 | * | 1/2005 |
| KR | 1020020019221 | | 3/2007 |
| SU | 867255 A1 | | 8/1982 |
| WO | 9718160 | | 5/1997 |

OTHER PUBLICATIONS

Sun et al. (H. Y. Sun, H.-J. Sohn, O. Ymamoto, Y. Takeda, and N. Imanishi, Enhanced Lithium-Ion Transport in PEO-Based Composite Polymer Electrolytes with Ferroelectric BaTiO3, Journal of the Electrochemical Society, 1999, 146 (5), pp. 1672-1676).*

JPO IPDL machine translation of JP2005025992, published on Jan. 27, 2005, retrieved on Nov. 30, 2009.*

Machine translation of JP 2005-025992, Nagashima et al., Jun. 30, 2003.*

International Search Report dated Mar. 15, 2006 for Application No. PCT/KR2005/004169.

Chinese Office Action of May 30, 2008 to Chinese Patent Application No. 2005800289171 (claiming priority to KR10-2004-0102532).

Kumar, B., From colloidal to composite electrolytes: properties, peculiarities, and possibilities, Journal of Power Sources, 135, Feb. 27, 2004, pp. 215-231, University of Dayton Research Institute.

European Extended Search Report; Application No. 05821424.8 dated Jul. 23, 2010.

* cited by examiner

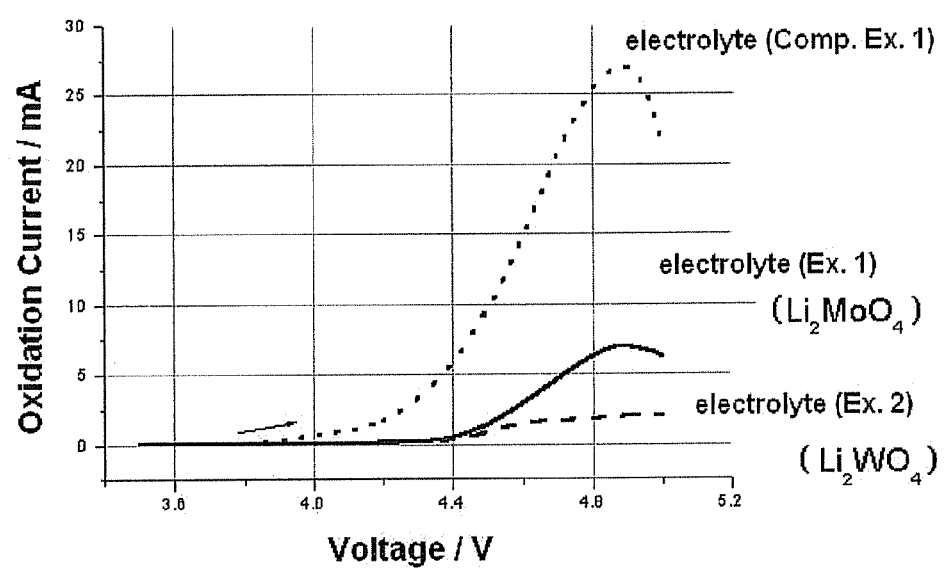

NONAQUEOUS ELECTROLYTE COMPRISING OXYANION AND LITHIUM SECONDARY BATTERY USING THE SAME

TECHNICAL FIELD

The present invention relates to an electrolyte that can prevent corrosion of metallic interior and exterior materials of a battery, caused by abnormal conditions, such as overcharge, overdischarge and high-temperature storage conditions, to which the battery is exposed. The present invention also relates to an electrochemical device, preferably a lithium secondary battery, which comprises the above electrolyte, and thus degradation in the quality, caused by corrosion of metallic materials, is prevented.

BACKGROUND ART

Recently, as electronic devices become smaller and lighter, batteries used therein as power sources are increasingly required to have a compact size and light weight. As rechargeable batteries with a compact size, light weight and high capacity, lithium secondary batteries have been put to practical use and widely used in portable electronic and communication devices such as compact camcorders, portable phones, notebook PCs, or the like.

A lithium secondary battery comprises a cathode, an anode and an electrolyte. Such lithium secondary batteries are capable of repeated charge/discharge cycles, because lithium ions deintercalated from a cathode active material upon the first charge cycle are intercalated into an anode active material (for example, carbon particles) and deintercalated again during a discharge cycle, so that lithium ions reciprocate between both electrodes while transferring energy.

In general, metals and metal alloys, such as iron, aluminum, copper, nickel, etc. are widely used as materials for forming a can for housing a lithium secondary battery and forming a collector of a lithium secondary battery. Such metallic materials are not susceptible to corrosion (oxidation) under the normal charge/discharge conditions of a lithium secondary battery. However, under extreme conditions, such as overcharge, overdischarge and high-temperature storage conditions, such metallic materials tend to show a great possibility of corrosion. Particularly, when a battery is overdischarged to a voltage of 0V at low current or under constant resistance, the voltage of an anode having a high irreversible capacity increases in advance of the voltage of a cathode. Under these circumstances, when the anode voltage reaches to a specific voltage range of about 3.6V or higher, at which point copper foil used as an anode collector is oxidized, copper dissolution (i.e. oxidation) occurs, resulting in damages of the battery. In brief, corrosion of metallic materials present inside of a battery under the overcharge, overdischarge and high-temperature storage conditions, causes the problems of self-discharge, a drop in capacity, internal short circuit and an increase in internal resistance of the battery, resulting in degradation in the quality of a battery and damages of the battery.

BRIEF DESCRIPTION OF THE DRAWINGS

The foregoing and other objects, features and advantages of the present invention will become more apparent from the following detailed description when taken in conjunction with the accompanying drawing in which:

FIG. 1 is a graph showing the electrochemical oxidation characteristics of the inner walls of the cylindrical cans, in the batteries using the electrolyte according to Example 1 and the electrolyte according to Example 2, to which $Li_2MoO_4$ and $Li_2WO_4$ are added, respectively, as a multinary metal oxide salt; and in the battery using a conventional electrolyte according to Comparative Example 1, as a control.

DISCLOSURE OF THE INVENTION

Therefore, the present invention has been made in view of the above-mentioned problems. The present inventors have found that when a metal oxide salt, which is dissolved and dissociated in a non-aqueous electrolyte solvent to generate oxyanions having an activity of inhibiting oxidation (corrosion) of metallic materials, is used for forming an electrolyte, it is possible to inhibit corrosion of metallic materials forming an electrochemical device, such as a metallic can and a collector, and to prevent the electrochemical device from being degraded in its quality by corrosion of metallic materials.

Therefore, it is an object of the present invention to provide a non-aqueous electrolyte comprising the above-mentioned metal oxide salt, and an electrochemical device, preferably a lithium secondary battery, comprising the same electrolyte.

According to an aspect of the present invention, there is provided an electrolyte comprising: (a) an electrolyte salt; (b) a non-aqueous electrolyte solvent; and (c) a binary or multinary metal oxide salt. There is also provided an electrochemical device, preferably a lithium secondary battery, comprising the same electrolyte.

Hereinafter, the present invention will be explained in more detail.

The present invention is characterized by using a multinary metal oxide salt, capable of ionization upon dissolution, in a non-aqueous electrolyte solvent.

Unlike conventional oxides (U.S. Pat. No. 5,168,019), which are comprised of covalent bonds and thus are not dissociated in an electrolyte solvent, the above-mentioned metal oxide salt is comprised of ionic bonds, and thus is dissociated with ease when it is dissolved in an electrolyte solvent currently used in a battery. Moreover, the metal oxide salt can generate oxyanions, after the dissociation, and such oxyanions can improve the corrosion resistance of metals. The oxyanions significantly reduce the possibility of corrosion of metallic materials, which otherwise increases under abnormal conditions, such as overcharge, overdischarge and high-temperature storage conditions. Therefore, the oxyanions generated from the metal oxide salt can prevent degradation in the quality of an electrochemical device, caused by corrosion of metallic materials present inside the device.

One component forming the electrolyte according to the present invention is a binary or multinary metal oxide salt. There is no particular limitation in the metal oxide salt, as long as it is comprised of ionic bonds and is ionizable in water and/or organic solvents. As described above, the metal oxide salt is dissociated into oxyanions when it is dissolved in an electrolyte solvent currently used in a battery, and such oxyanions are adsorbed on a protection film generally formed on the surface of a metallic can and/or collector. For example, such oxyanions are adsorbed on defects present on an oxide film. It is thought that such adsorbed oxyanions prevent any oxidation generated from the defects. Therefore, it is possible to solve the problems caused by corrosion of the metallic materials. Such problems include self-discharge, a drop in capacity, internal short circuit and an increase in internal resistance of an electrochemical device, preferably of a battery. Further, it is possible to prevent degradation in the battery quality and damages of the battery.

According to a preferred embodiment of the present invention, the metal oxide salt is represented by the following formula 1, but is not limited thereto:

$$A_xM_yO_z \quad \text{[Formula 1]}$$

wherein A is at least one element selected from the group consisting of alkali metals and alkaline earth metals;

M is at least one element selected from the group consisting of non-metals, metalloids and transition metals;

$1 \leq x \leq 6$;

$1 \leq y \leq 7$; and $2 \leq z \leq 24$.

Non-limiting examples of the multinary metal oxide salt represented by formula 1 include: $Li_4SiO_4$, $Li_2B_4O_7$, $Li_2MoO_4$, $Li_2WO_4$, $Li_2CrO_4$, $Li_2TiO_3$, $Li_2ZrO_3$, $LiTaO_3$, $LiNbO_3$, $Na_4SiO_4$, $Na_2B_4O_7$, $Na_2MoO_4$, $Na_2WO_4$, $Na_2CrO_4$, $Na_2TiO_3$, $Na_2ZrO_3$, $NaTaO_3$, $NaNbO_3$, $Cs_4SiO_4$, $Cs_2B_4O_7$, $Cs_2MoO_4$, $Cs_2WO_4$, $Cs_2CrO_4$, $Cs_2TiO_3$, $Cs_2ZrO_3$, $CsTaO_3$, $CsNbO_3$, $Mg_2SiO_4$, $MgB_4O_7$, $MgMoO_4$, $MgWO_4$, $MgCrO_4$, $MgTiO_3$, $MgZrO_3$, $Ba_4SiO_4$, $BaB_4O_7$, $BaMoO_4$, $BaWO_4$, $BaCrO_4$, $BaTiO_3$, $BaZrO_3$ and mixtures thereof. Particularly, when a lithium-containing metal oxide salt is used as the multinary metal oxide salt, it is possible to minimize degradation in the quality of a battery, caused by using the additive for electrolyte, because a higher concentration of lithium ions is available for electrochemical reactions occurring in the battery. In addition to the above-described salts, any compounds may be used in the scope of the present invention regardless of their elements or configurations, as long as they are dissolved in a non-aqueous electrolyte solvent and generate oxyanions so as to serve to inhibit corrosion of metallic materials.

Preferably, the multinary metal oxide salt is used in an amount of 0.01~10 wt % per 100 parts by weight of the electrolyte, but the content of the metal oxide salt is not limited thereto. If the content of the metal oxide salt is less than 0.01 wt %, it is not possible to obtain the effect of preventing corrosion of metallic materials to a sufficient degree. On the other hand, if the content of the metal oxide salt is greater than 10 wt %, the metal oxide salt may not be dissolved in the electrolyte completely.

The electrolyte, to which the metal oxide salt is added, may comprise conventional electrolyte components known to one skilled in the art, for example an electrolyte salt and a non-aqueous electrolyte solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. Non-limiting examples of the non-aqueous electrolyte solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof.

According to another aspect of the present invention, there is provided an electrochemical device, which comprises a cathode, an anode and an electrolyte, wherein the electrolyte comprises the above-described multinary metal oxide salt.

Such electrochemical devices include any devices in which electrochemical reactions occur, and particular examples thereof include all kinds of primary batteries, secondary batteries, fuel cells, solar cells or capacitors. Particularly, the electrochemical device is a lithium secondary battery including a lithium metal secondary battery, lithium ion secondary battery, lithium polymer secondary battery or lithium ion polymer secondary battery.

The electrochemical device may be manufactured by a conventional method known to one skilled in the art. In one embodiment of the method for manufacturing the electrochemical device, a separator is interposed between a cathode and anode to provide an assembly, and then an electrolyte, containing the metal oxide salt added thereto, is injected.

There is no particular limitation in the electrode that may be applied together with the electrolyte according to the present invention. The electrode may be formed by applying an electrode active material on a current collector according to a method known to one skilled in the art.

More particularly, cathode active materials may include any conventional cathode active materials currently used in a cathode of a conventional electrochemical device. Particular non-limiting examples of the cathode active materials include: lithium transition metal composite oxides, such as a composite oxide represented by the formula of $LiM_xO_y$, wherein M=Co, Ni, Mn, $Co_aNi_bMn_c$ (e.g. lithium manganese composite oxides; lithium nickel oxides; lithium cobalt oxides; lithium iron oxides; other composite oxides thereof, in which manganese, nickel, cobalt and iron present in the above oxides are partially substituted with other transition metals; and lithium-containing vanadium oxides); chalcogen compounds (e.g. manganese dioxide, titanium dioxide, molybdenum dioxide, etc.); and mixtures thereof.

Additionally, anode active materials may include any conventional anode active materials currently used in an anode of a conventional electrochemical device. Particular non-limiting examples of the anode active materials include: lithium metal; lithium alloys; carbon; petroleum coke; activated carbon; graphite; other carbonaceous materials; and lithium intercalation materials capable of lithium intercalation/deintercalation and having a potential of less than 2V based on lithium, for example $TiO_2$ and $SnO_2$.

Non-limiting examples of a cathode current collector include foil formed of aluminum, nickel or a combination thereof. Non-limiting examples of an anode current collector include foil formed of copper, gold, nickel, copper alloys or a combination thereof.

There is no particular limitation in the separator that may be used in the present invention, as long as it is a porous material that interrupts an internal short circuit between both electrodes and is impregnated with the electrolyte. Particular non-limiting examples of porous separators include polypropylene-based, polyethylene-based, polyolefin-based porous separators, and composite porous separators comprising the above porous separators, to which inorganic materials are added.

There is no particular limitation in the shape of the electrochemical device according to the present invention. The electrochemical device may be a cylindrical can-type, prismatic, pouch-type or a coin-type electrochemical device. Particularly, a cylindrical device comprising a metallic can connected with an anode of a battery is preferred, a cylindrical lithium secondary battery being more preferred. In the latter case, the effect of preventing corrosion of the metallic can, derived from the multinary metal oxide when the battery is exposed to overcharge, overdischarge or high-temperature storage conditions, is more significant compared to other batteries having different shapes.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1~2

Manufacture of Lithium Secondary Batteries

Example 1

$LiCoO_2$ was provided as a cathode active material. Next, 90 wt % of $LiCoO_2$, 5 wt % of Super-P as a conductive agent and 5 wt % of PVDF (polyvinylidene difluoride) as a binder were mixed, and then the resultant mixture was added to NMP (N-methyl-2-pyrrolidone) as a solvent to form cathode slurry. The slurry was applied on an aluminum (Al) collector to form a cathode. Then, lithium metal as an anode and the cathode formed as described above were used to manufacture a cylindrical battery. As an electrolyte, EC/EMC solution containing 1M $LiPF_6$ was used, and 0.5 wt % of $Li_2MoO_4$ was added to the electrolyte.

Example 2

Example 1 was repeated to manufacture a cylindrical lithium secondary battery, except that $Li_2WO_4$ was used instead of $Li_2MoO_4$.

COMPARATIVE EXAMPLE 1

Example 1 was repeated to manufacture a cylindrical lithium secondary battery, except that no additive was added to the electrolyte.

EXPERIMENTAL EXAMPLE 1

Evaluation for Oxidation

Oxidation characteristics of metallic materials were evaluated by using the electrolyte, to which a metal oxide salt was added according to the present invention.

The electrolytes according to Examples 1 and 2, which contain $Li_2MoO_4$ and $Li_2WO_4$, respectively, as a multinary metal oxide salt, were used. As a control, a conventional electrolyte according to Comparative Example 1 was used.

The inner wall of a can currently used in a cylindrical battery was used as a work electrode, lithium metal was used as a reference electrode, and a platinum (Pt) wire electrode was used as a counter electrode, in order to carry out linear sweep voltammetry. By doing so, each of the electrolytes according to Examples 1 and 2 and Comparative Example 1 was evaluated for its effect upon the electrochemical oxidation characteristics of the inner wall of the can for a cylindrical battery. The results are shown in FIG. 1. During the evaluation, a scanning rate of 10 mV/s was used, and oxidation characteristics were determined in a glove box under the argon atmosphere containing at most 10 ppm of moisture and oxygen.

After the test, the electrolytes according to Examples 1 and 2, to which $Li_2MoO_4$ and $Li_2WO_4$ are added, respectively, showed an oxidation initiation voltage increased by about 0.4V, as compared to the conventional electrolyte according to Comparative Example 1. Additionally, the electrolytes according to Examples 1 and 2 showed a significantly decreased oxidation current (see FIG. 1). This indicates that the multinary metal oxide salt added to the electrolytes improve the oxidation resistance of the cylindrical can.

Therefore, the electrolyte according to the present invention, comprising a metal oxide salt as an additive, can improve the oxidation resistance of metallic materials used in a battery.

INDUSTRIAL APPLICABILITY

As can be seen from the foregoing, the electrolyte according to the present invention, which comprises a multinary metal oxide salt that is dissolved in a non-aqueous electrolyte solvent and generates oxyanions capable of improving the oxidation resistance of metals, can prevent corrosion of metallic materials present in an electrochemical device, such as a collector and a metallic can, and can minimize degradation in the quality of the device, caused by corrosion of metallic materials.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A liquid electrolyte for a cylindrical lithium secondary battery, the liquid electrolyte comprising:
   (a) an electrolyte salt;
   (b) a non-aqueous electrolyte solvent; and
   (c) at least one binary or multinary metal oxide salt, selected from the group consisting of $Li_2CrO_4$, $Li_2TiO_3$, $Li_2ZrO_3$, $Na_4SiO_4$, $Na_2B_4O_7$, $Na_2MoO_4$, $Na_2WO_4$, $Na_2CrO_4$, $Na_2TiO_3$, $Na_2ZrO_3$, $NaTaO_3$, $NaNbO_3$, $Cs_4SiO_4$, $Cs_2B_4O_7$, $Cs_2MoO_4$, $Cs_2WO_4$, $Cs_2CrO_4$, $Cs_2TiO_3$, $Cs_2ZrO_3$, $CsTaO_3$, and $CsNbO_3$.

2. The liquid electrolyte according to claim 1, wherein the metal oxide salt is an ionically bonded salt of oxide.

3. The liquid electrolyte according to claim 1, wherein the metal oxide salt is used in an amount of 0.01~10 wt % per 100 wt % of the electrolyte.

4. The liquid electrolyte according to claim 1, wherein the electrolyte salt is a salt represented by the formula of $A^+B^-$, wherein $A^+$ represents an alkali metal cation selected from the group consisting of $Li^+$, $Na^+$ and $K^+$, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$; and the non-aqueous electrolyte solvent is at least one solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC) and gamma-butyrolactone (GBL).

5. A cylindrical lithium secondary battery comprising a cathode, an anode, the liquid electrolyte as claimed in claim 1, and a metallic can, which receives the cathode, the anode and the electrolyte,
   wherein the liquid electrolyte comprises (a) the electrolyte salt; (b) the non-aqueous electrolyte solvent; and (c) at least one binary or multinary metal oxide salt selected from the group consisting of $Li_2CrO_4$, $Li_2TiO_3$, $Li_2ZrO_3$, $Na_4SiO_4$, $Na_2B_4O_7$, $Na_2MoO_4$, $Na_2WO_4$, $Na_2CrO_4$, $Na_2TiO_3$, $Na_2ZrO_3$, $NaTaO_3$, $NaNbO_3$, $Cs_4SiO_4$, $Cs_2B_4O_7$, $Cs_2MoO_4$, $Cs_2WO_4$, $Cs_2CrO_4$, $Cs_2TiO_3$, $Cs_2ZrO_3$, $CsTaO_3$, and $CsNbO_3$.

6. The cylindrical lithium secondary battery according to claim 5, wherein the metal oxide salt is an ionically bonded salt of an oxide.

7. The cylindrical lithium secondary battery according to claim 5, wherein the metal oxide salt is dissociated to generate oxyanions, when it is dissolved in a non-aqueous electrolyte solvent.

8. The cylindrical lithium secondary battery according to claim 5, wherein the metal oxide salt is used in an amount of 0.0~110 wt % per 100 wt % of the liquid electrolyte.

9. The cylindrical lithium secondary battery according to claim 5, wherein the electrolyte salt is a salt represented by the formula of $A^+B^-$, wherein $A^+$ represents an alkali metal cation selected from the group consisting of $Li^+$, $Na^+$ and $K^+$, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$; and the non-aqueous electrolyte solvent is at least one solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC) and gamma-butyrolactone (GBL).

* * * * *